(No Model.)
S. L. TRIPPE.
ELECTRODE FOR ELECTRIC BATTERIES.
No. 348,482. Patented Aug. 31, 1886.
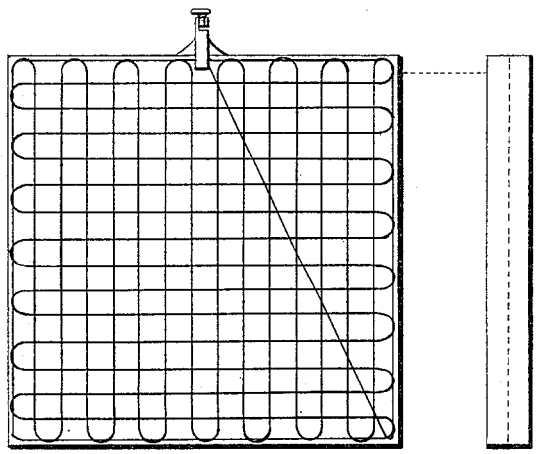
WITNESSES:
Chas. Stoll
M. P. Cochrane
INVENTOR
S. L. Trippe
BY R. S. Dyrenforth,
his ATTORNEY

UNITED STATES PATENT OFFICE.

SYLVANUS L. TRIPPE, OF DENVER, COLORADO.

ELECTRODE FOR ELECTRIC BATTERIES.

SPECIFICATION forming part of Letters Patent No. 348,482, dated August 31, 1886.

Application filed November 18, 1885. Serial No. 183,186. (No model.)

*To all whom it may concern:*

Be it known that I, SYLVANUS L. TRIPPE, a citizen of the United States, residing in the city of Denver, in the county of Arapahoe and State of Colorado, have invented certain new and useful Improvements in Electrodes for Electric Batteries; and I hereby declare the following to be a full, clear, and exact description of the same.

The object is to produce an electrode which shall have the maximum storage capacity, one that will yield in its discharge a steady current of uniform intensity, and possess fully the ability to withstand any overcharge that might be occasioned by various circumstances without the usual disastrous results heretofore experienced in the employment of porous lead electrodes—in short, to produce an electrode which shall be simple and cheap in construction, and convenient, efficient, and reliable in use.

The invention consists in the combination, with an electrode made with lead and zinc and an electrically-conductive substance—such as silver or copper—of a wire frame.

In the processes heretofore in general use for making electrodes for secondary or storage batteries lead in some form has been considered the material most suitable for storing the electric energy; but in the practical use of this metal many and serious difficulties are met with. It is well understood that the surface alone retains the electrical energy, and that certain well-known chemical changes thereon take place when lead plates are subjected to the action of an electric current. Lead-plate electrodes of sufficient surface to retain sufficient electrical energy would be too large and heavy for a practical application for general purposes, and in order to increase the actual surface of the lead plates, among other methods, it has been proposed to render the lead plates porous, in order to increase the useful surface of the lead, by mixing with the lead certain other substances, which may be withdrawn therefrom by either chemical or electric action, such as mixing zinc with lead in the construction of the plates and withdrawing the same therefrom by the use of acids, &c. I find by experiment that while this process will make the lead plate porous, and probably give the greatest possible attainable surface, the withdrawal of zinc or other substance from its mixture with the lead will leave the plate so fragile that under a very slight overcharge of electricity it will fall to pieces or crumble and become worthless, unless some substance is also mixed with the lead to sustain and strengthen the plate after the withdrawal of the zinc or other material. In order, therefore, to avail myself of the method of surfacing or rendering the plate porous by the withdrawal of the zinc used therein, I add to the mixture of lead and zinc either silver or copper, which will not be withdrawn during the process of "forming" or surfacing the plate in the usual well-known "Planté process," but which remains in its mixture with the lead and sustains and supports the same. At the same time it adds to the conductivity of the plate or electrode.

In preparing the metal for the electrode I use sixty-five parts lead, thirty parts zinc, and five parts in each one hundred of either silver or copper. These metals are melted together and thoroughly mixed and stirred and cast into plates of the desired size for use in the battery. To further strengthen and support the electrodes I cast them in and through a coil of wire, preferably of copper. The wire coil or core is woven or interlaced and joined, so as to make a strong frame for the electrode, and the ends of the wire are fastened to a binding-screw, also cast in the side or end of the electrode.

The drawing shows one method of making the wire coil to support the plate, though it is obvious many other methods of interlacing the wire may be used without departing from the general purpose sought to be obtained, and that wire of silver or other material may be used as well as the copper wire, which I prefer; hence I do not wish to confine myself to the exclusive use of copper wire in the exact method shown, though I consider it preferable. The wire extending to nearly all parts of the body of the electrode answers a twofold purpose. Beside its office in sustaining the plate, it carries the electric current to all adjacent interior parts of the plate during the process of forming, producing in the plate around the wire the same chemical change as is produced on the surface thereof wherever the liquid penetrates, and which is required for storage purposes, and when the battery is being discharged of its accumulated electric energy it acts as a conductor from all parts of the plate, and thus helps to keep up the constancy of the electromotive force.

In casting the electrodes from the alloy or mixture named care should be taken to thoroughly stir and mix them, as they alloy very imperfectly with the lead, and it is desirable to have as intimate a mixture as it is practicable to obtain. The wire used should also be as fine as practicable with sufficient strength, so that when it is placed in the mold for casting it will not too greatly interfere with the flow of the melted metal.

In the manufacture of electrodes containing no greater outside surface than one square foot and not more than one-quarter of an inch in thickness the above-named proportion of lead, zinc, and silver or copper will give the best practical results; but when the electrodes are desired of greater size the proportion of either silver or copper may be increased, and that of the zinc correspondingly reduced, though a variation of more than five per cent. therein will not be found probably advisable.

I am aware that zinc and other substances have been alloyed or mixed with lead and the same withdrawn from the lead plate in order to surface the plate, and that the method of forming or preparing electrodes for use in secondary or storage batteries, known as the "Planté process" is in general use; but

What I claim as new, and desire to secure by Letters Patent, is—

The combination of an electrode for use in a secondary or storage battery, made from an alloy or mixture of lead, zinc, and a conductive strengthening material, with a coil or core of wire cast with such electrode, the ends of which wire terminate in or around a binding-screw cast in the end or side of such electrode, substantially as described.

SYLVANUS L. TRIPPE.

In presence of—
CHAS. W. REITLER,
ROBT. E. FOOT.